Dec. 29, 1964
L. TROY
3,163,412
SELF-LEVELING AND SELF-CONTAINED
VEHICLE SUSPENSION STRUT
Filed April 16, 1963
4 Sheets-Sheet 1
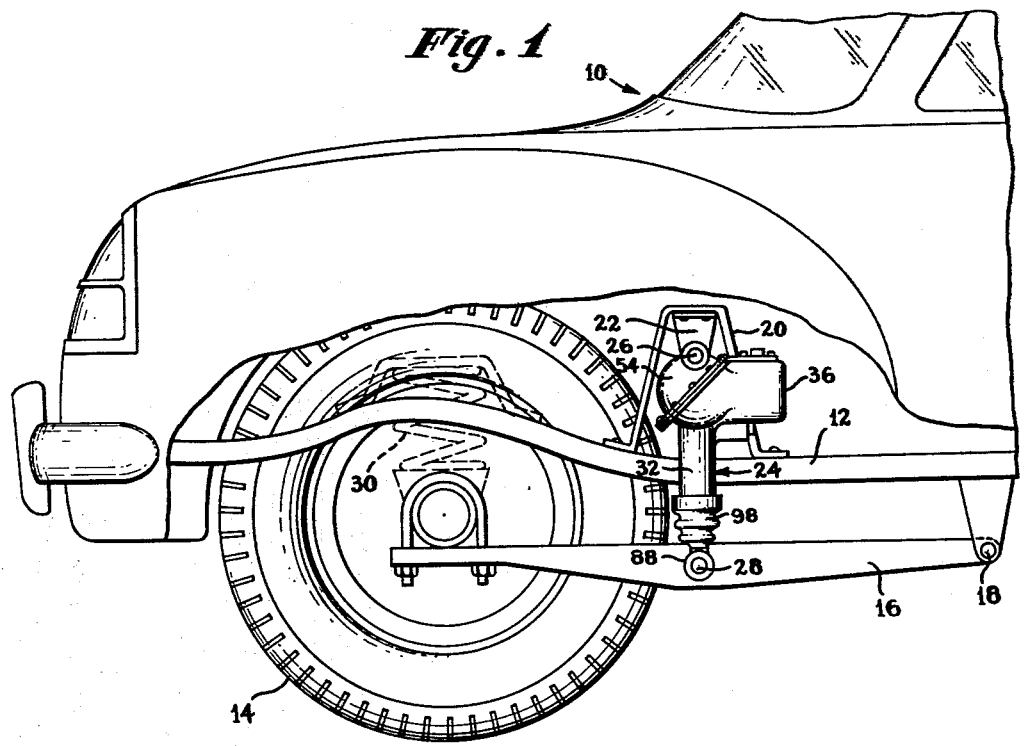
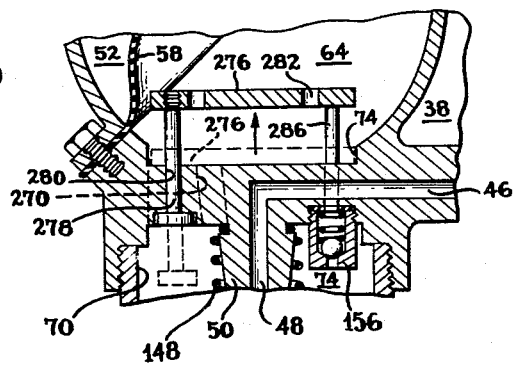
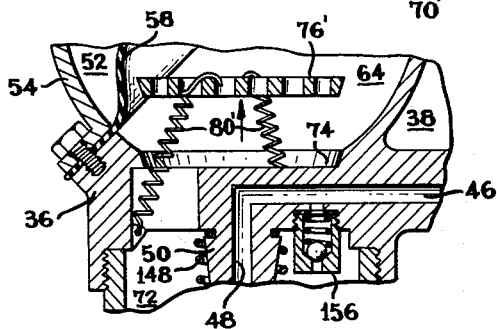
INVENTOR
LEONARD TROY
BY Samuel Meerkreebs
ATTORNEY

INVENTOR
LEONARD TROY

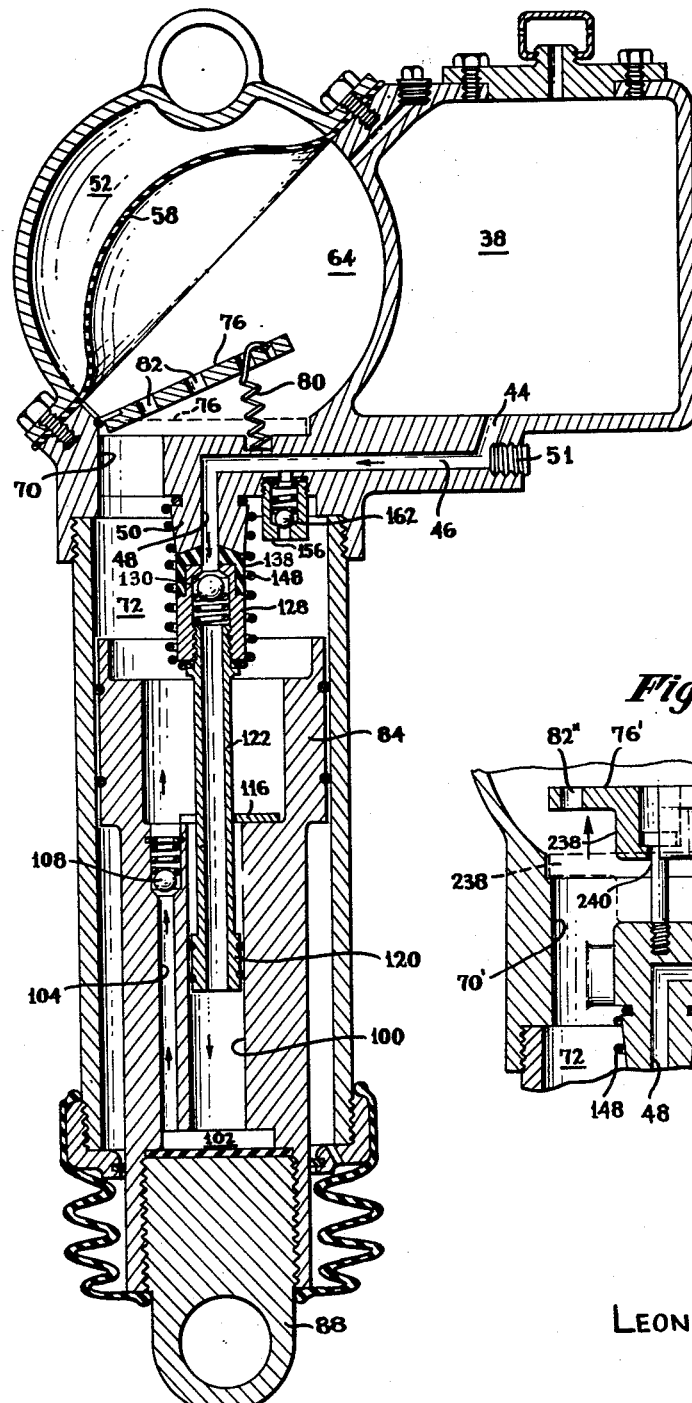
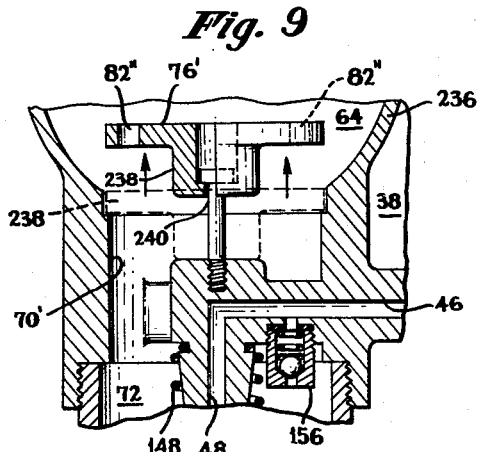
Fig. 3
Fig. 9
INVENTOR
LEONARD TROY

Dec. 29, 1964
L. TROY
3,163,412
SELF-LEVELING AND SELF-CONTAINED
VEHICLE SUSPENSION STRUT
Filed April 16, 1963
4 Sheets-Sheet 4
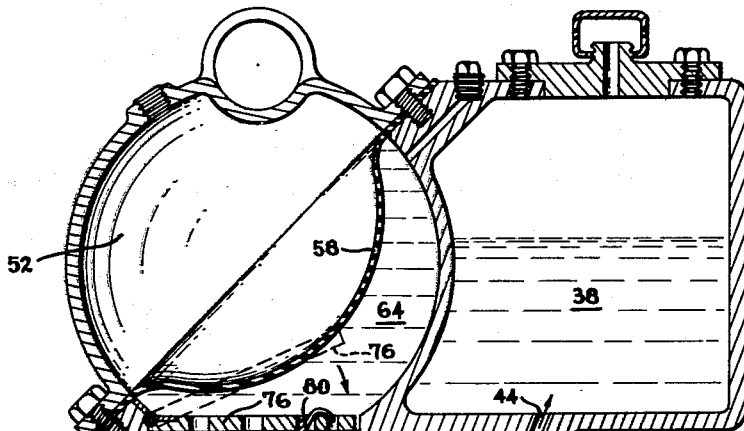
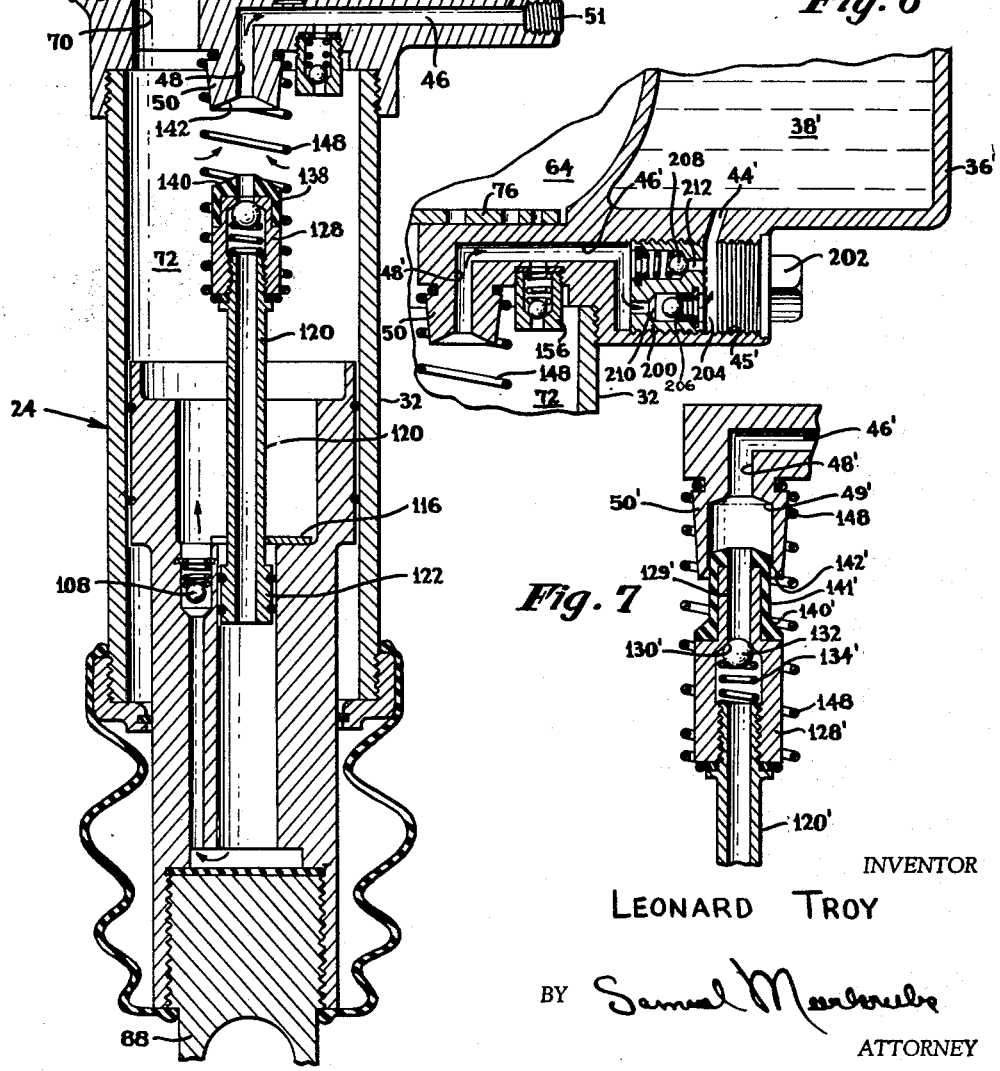
INVENTOR
LEONARD TROY
BY Samuel Moulovits
ATTORNEY

United States Patent Office 3,163,412
Patented Dec. 29, 1964

3,163,412
SELF-LEVELING AND SELF-CONTAINED
VEHICLE SUSPENSION STRUT
Leonard Troy, 5 Pen-Y-Bryn Drive, Scranton, Pa.
Filed Apr. 16, 1963, Ser. No. 273,350
9 Claims. (Cl. 267—15)

This invention pertains to improvements in a self-leveling suspension system especially adapted for use on vehicles to suspended and maintain the vehicle frame a predetermined level above a road or support surface.

There has been a constant endeavor, especially in recent years, to improve vehicle suspension systems. To this end, attempts have been made toward eliminating conventional mechanical springs, by using pneumatic or hydraulic-pneumatic springs.

A primary object of the present invention is to provide a self-regulating and self-contained suspension device for vehicle frames.

Another object of the present invention is to provide a self-contained suspension device utilizing hydraulic fluid and fluid pressure cushion which may be used in conjunction with or independently of conventional vehicle springs.

A further object of the invention is to provide a novel self-contained frame leveling suspension strut which is readily installed, easily maintained and which compensates for irregularities of the terrain over which the vehicle passes, compensates for jacking up of a vehicle during tire changes, and generally compensates for changes of the vehicle frame orientation with respect to the running gear of the vehicle.

Other and more specific objects of the invention will become apparent from a consideration of the following description taken in conjunction with the accompanying drawings forming a part thereof, wherein:

In the drawings:

FIGURE 1 is a rear elevation of a fragmentary rear portion of a vehicle showing a typical installation of the novel self-leveling suspension strut of the invention, and showing by phantom lines the optional use thereof with a coil spring;

FIGURE 3 is a view similar to FIGURE 2, showing the position assumed by the parts when a greater than normal load is imposed on the suspension strut;

FIGURE 4 is a view similar to FIGURES 2 and 3, showing the position assumed by the parts during excessive pressure extension of the suspension unit over a predetermined length;

FIGURE 6 is an enlarged fragmentary section, similar to a portion of FIGURES 2-4 and showing an alternate valve arrangement for the system;

FIGURE 7 is an enlarged fragmentary section similar to a portion of FIGURES 2-4, showing an alternate pumping-piston fluid pressure relief valve minimizing fluid pumping when a vehicle passes over minor terrain irregularities; and FIGURES 8, 9 and 10 are sectional views similar to a portion of FIGURES 2-4 and showing alternate surge baffles for the novel suspension strut.

Figures 2, 5:
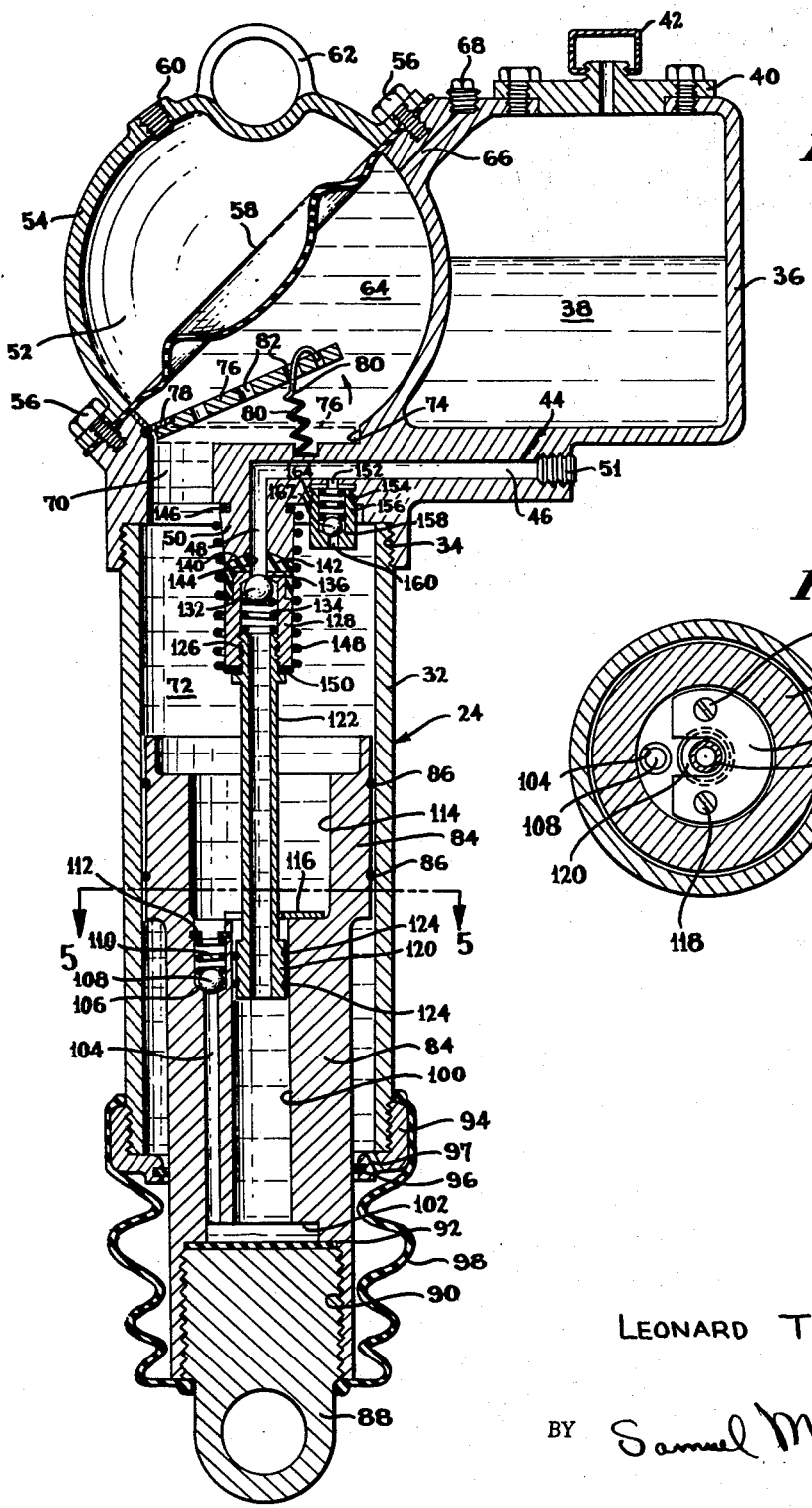
FIGURE 2 is an enlarged vertical section through the novel suspension strut, showing the normal position of the parts.
FIGURE 5 is a horizontal section taken on line 5—5 of FIGURE 2.

Referring to the drawings in detail, and first considering FIGURE 1, a fragmentary rear portion of a vehicle is indicated generally at 10. The vehicle includes a frame 12 connected to the wheels 14 by means of a trailing link 16 pivoted on the frame at 18. Mounted on the frame 12 is a support bracket 20 having a depending bearing portion 22.

Indicated generally at 24 is a self-leveling, self-contained suspension strut which is pivotally connected to the bearing portion 22 and link 16, respectively, at 26 and 28.

The wheels 14 will rise and fall when traversing irregularities of a road surface, and the suspension strut will maintain or compensate for such irregularities and maintain the vehicle frame level, i.e., the distance between the frame and link 16 substantially constant.

In addition to the self-leveling feature, the suspension strut includes a cushioning chamber which will replace or supplement coil springs 30 or the like.

The relative simplicity of installing the suspension strut on new vehicles or modifying existing suspension systems will be clearly evident to those skilled in the art.

The suspension strut 24 comprises an elongated body comprising a cylindrical body member 32 having removably secured to the upper end thereof at 34 a head 36. The head 36 includes a hydraulic fluid reservoir 38 including a sealing plate 40 including a vent cap 42 venting the reservoir to atmospheric pressure.

The reservoir 38 includes a lower outlet port 44 communicating with a lateral bore 46 terminating in an axial bore 48 formed in an axially projecting valve seat element 50 integral with the head member 36. The bore 46 includes a plug 51 accessible at the outer surface of the head.

Although the reservoir is illustrated as being integral with the head 36, the reservoir can comprise a separate unit common to the several suspension struts on a vehicle suspension installation.

Adjacent to the reservoir 38 is a substantially semi-spherical shock absorbing chamber 52 formed by a semi-spherical dome 54 peripherally clamped at 56 on a flexible diaphragm 58. The dome 56 includes a tapered bore 60 for receiving a pipe leading to a source of pressure fluid, i.e., air, for example, whereby the chamber 52 may be charged with a residual pressure above the flexible diaphragm 58.

The dome 60 includes a circular mounting ring 62 permitting the suspension strut to be pivotally mounted at 26 on the bearing portion 22 of the bracket 20; see FIGURE 1.

The head 36 includes a semi-spherical fluid chamber 64, normally filled with hydraulic fluid reaching against the undersurface of the diaphragm 58. The head 36 includes a port 66 communicating with chamber 64 to permit bleeding of air from chamber 64 by means of a suitable plug 68.

The head includes a lower passage 70 communicating the chamber 64 with an interior shock absorbing chamber 72 of the cylindrical body member 32.

The head member 36 includes an annular seat 74 at the base of chamber 64 into which the passage 70 extends, and a baffle plate 76 is hinged at 78 at one side of the seat 74.

The plate 76 is normally urged to the dotted line position shown in FIGURE 2 by a spring element 80 and is transversely apertured at 82. The function of the baffle plate 76 and alternate embodiments thereof will be subsequently described in detail.

The cylinder member 32 has reciprocably supported therein a piston member 84 which is peripherally sealed at 86 to form the lower end of the shock absorbing chamber 72. The piston member 84 includes a lower circular bearing portion 88 for pivotal connection at 28 on link 16 or the like. The bearing portion 88 may comprise a separate element threaded into the piston member 88 as indicated at 90 and sealed as indicated at 92.

The cylindrical body member 32 includes at the lower end thereof a nut 94 which supports a lip seal 96 engaging the outer surface of the piston member. The nut 94 includes a passage 97 for relieving pressure below the piston member 84.

A suitable sealing boot 98 is provided between the body member 32 and lower end of the piston member, and the passage communicates with the interior of the boot.

The piston member 84 includes a longitudinal axial bore 100 opening into a recess 102 at the lower end thereof, and a lateral, longitudinally extending passage 104 communicates at its lower end with the recess 102. The upper end of the passage 104 includes a valve seat 106 on which is seated a check valve ball element 108 which is urged into the valve seat 106 by a compression spring 110 engaged by lock washer 112.

The passage 104 communicates at its upper end with an annular recess 114 in the upper end of the piston member 84 and a substantially U-shaped retainer plate 116 is secured at 118 in substantially overlying relationship to the upper end of the axial bore 100.

Reciprocably received in bore 100 is the enlarged lower end 120 of an elongated, tubular valve rod 122 which is suitably sealed in the bore 100 as indicated at 124. The head 120 will engage the undersurface of the retainer plate and be prevented thereby from being withdrawn from the bore 100 during operation of the suspension unit for a purpose to be subsequently described in detail.

The valve rod 122 is threaded at 126 into a hollow valve head 128. The valve head 128 includes an internal valve seat 130 engaged by a ball element 132 urged into sealing relation thereon by a compression spring 134 for controlling uni-directional fluid flow through an axial passage 136.

The valve head 128 has suitably secured to the upper end thereof an annular sealing element 138 having a substantially conical upper surface 140 sealingly engaging a complementary conical seat 142 formed on the lower end of axial valve seat element 50. The sealing element 138 is centrally apertured at 144 to permit communication between bore 48 and passage 136.

The axial valve seat element has fixed in an upper annular groove 146 one end of a coil spring 148, the other end of the spring being fixed at 150 to a groove about the valve head 128. The spring 148 is effective to normally urge the surface 140 into sealed engagement on the seat 142.

The passage 46 communicating with the reservoir 38 communicates with a lower, intermediate passage 152 terminating in a threaded bore 154 opening into the shock absorbing chamber 72. Received in the bore 154 is a tubular valve body 156 having an internal valve seat 158 surrounding a passage 160 communicating with the shock absorbing chamber 72. A ball check element 162 is normally urged into sealed engagement on valve seat 158 by spring 164 to permit uni-directional fluid flow from chamber 72 into passage 46.

*Operation*

Referring to FIGURES 1 and 2, when a load is placed upon the suspension unit 24, i.e., a passenger or passengers enter the vehicle 10, relative movement occurs between piston member 84 and valve rod 122 since the piston moves within the cylindrical body member 32.

When this relative movement occurs, fluid is forced through bore 100, recess 102, passage 104, past valve ball 108 into shock absorbing chamber 72, through passage 70 and into fluid chamber 64 to react against diaphragm 58.

Fluid is drawn from reservoir 38 via passages 44, 46, 48 and past ball valve 132 to compensate for movement of the diaphragm 58.

As the vehicle moves over terrain irregularities, there is a continuous oscillation of the piston member 84 with respect to the cylinder 32 and valve rod 122 resulting in a pumping or drawing of fluid from the reservoir 38 in the manner mentioned above. As fluid is pumped, the shock absorbing chamber 72 fills up to the extent that the plate 116 engages the valve tube head 120 resulting in the valve head 128 being drawn downwardly; shown exaggerated in FIGURE 4, whereby the seal 140 unseats and accumulated pressure in chambers 72, 64 is relieved back into reservoir 38 through passage 48, 46 and 44 past valve seat 130. The spring 148, it will be noted in FIGURE 4, will be extended and will subsequently reseat seal 140 on seat 130.

When the seal 140 is unseated, the pressurized diaphragm 58 will assume the position shown in FIGURE 4. The plate 76 will seat to prevent excessive surges of fluid within the suspension unit. It will be noted that the valve head 128 is shown in an exaggerated position in FIGURE 4. When the relative travel between piston member 84 and valve tube 122 is relatively slight, i.e., during normal travel and a relatively neutral condition exists, the plate 116 by engagement with the head 122, will cause sufficient cracking of seal 140 to compensate for the amount of fluid pumped past check valve 132.

The apertures 82 of the baffle plate 76 will permit fluid to be metered from chamber 64 to chamber 72 and/or reservoir 38; however, the plate will pivot upwardly due to sudden surges of pressure imposed thereunder, for example, when the vehicle strikes a bump.

Other similarly functioning baffle plates are shown in FIGURES 8–10, and will be subsequently described in detail. Additionally, another embodiment of a similarly functioning valve tube head is shown in FIGURE 7 and will be subsequently described in detail.

The check valve 162 functions as a relief valve to relieve sudden fluid surges and/or relieve internal pressure within the unit when the vehicles are tied down during transport on trailers, etc.

The showing in FIGURE 2 illustrates the suspension unit piston member at the midpoint of its stroke. Relatively little fluid is pumped on a smooth road.

FIGURE 3 illustrates the piston member 84 at its uppermost position of travel, i.e., just after the vehicle wheels have entered a "pothole" for example.

Note the baffle plate 76 is raised and the diaphragm 58 is bowed outwardly due to increased pressure.

FIGURE 4 illustrates the lowermost position of travel of piston member 84; note that the baffle plate 76 is seated and plate 116 has engaged valve tube head 122 and pulled seal 140 off seat 130, and diaphragm 58 causes fluid to be urged into reservoir 38.

Considering FIGURE 7, it will be noted that a modified axial valve seat element 50' includes an axial passage 48' communicating with a lateral passage 46'. The passage 48' terminates in a lower valve chamber 49' including a lower chamfered valve seat edge 142'. A valve tube 120' threadedly receives thereon a valve head 128' which has mounted thereon a ball check element 132' normally engaged on a valve seat 130' due to pressure of spring 134'.

The valve head 128' includes an elongated tubular extension 129' upon which is mounted a hat-shaped seal 140' including an axial extension 141' complementary to the valve chamber 49'.

The elongated axial extension 141' is in sealed relation with the valve chamber 49' over a predetermined increment of travel of the valve tube 120' due to engagement by the plate 116' with the head 122 (not shown), and thus reduces "over-sensitivity" of the suspension unit when the vehicle passes over minor terrain irregularities.

When the vehicle raises over a predetermined height, no pumping action occurs since valve heads 128 or 128' will be unseated, i.e., springs 148 will be under tension. No pumping action will occur during the unseating of seals 140, 140' and the relative movement between the piston member 84 and within the cylinder 32 results in flexing of springs 148.

Referring to FIGURE 6, a modified head 36' includes an enlarged tapped bore 45' communicating with lateral passage 46' and axial passage 48'.

A reservoir 38' communicates with a lower passage 44' communicating with the bore 45'. The tapped bore 45' receives therein a threaded valve body 200 which forms with a plug element 202 a chamber 204 communicating with the lower end of passage 44'.

The valve body 200 includes a pair of reversed, one-way check valves 206 and 208 controlling fluid flow through passages 210 and 212, respectively. The check valves 208 and 206 may conveniently comprise spring urged ball elements seated on internal, conical seats. Since these valves are similar to those previously described, a detailed description is apparently unnecessary.

Valve 206 will be designed to open at approximately the pressure required to maintain the vehicle, i.e., suspension unit, in a level ride condition when the vehicle is in an unloaded or "light" load condition. Valve 208 will permit fluid to be pumped in the manner and for the purpose previously described.

Thus, if the vehicle is jacked up, during a tire change, for example, the pressuring in the unit will not be materially reduced when the piston member 84 is at its lower most position and valve seals 140, 140' are off their cooperating valve seats, i.e., the shock absorbing chamber would normally be open to the reservoir.

Referring to FIGURE 8, another type of surge or baffle plate 76' is shown in its unseated position with respect to seat 74. The plate 76' includes transverse bleed apertures 82 and is retained in a normal seated position by coil springs 80'.

Considering FIGURE 9, the head 236 includes a passage 70' communicating with an annular recess. An inverted, hat-shaped baffle plate 76' includes a depending, apertured, hollow boss portion 238 and is gravity responsive as well as being acted upon by reactive pressure in chamber 52. The plate 76' is apertured at 82" and is retained to the head 36' and guided in vertical movement by a headed capscrew 240 disposed in the apertured hollow boss portion 238.

Referring to FIGURE 10, the recess 74 accommodates still another baffle plate 276 apertured at 282. The head includes a slightly modified port 270, and the plate 276 includes a depending guide and retaining screw 278 guidingly received in a transverse passage 280. The plate 276 may include a second depending guide pin 286 received in a suitable aperture in the head of the unit.

The baffle or surge plates 76, 76', 76" and 276 each function in the manner previously described in detail with respect to the baffle plate 76.

As previously mentioned, although not shown, the reservoir 38 is not necessarily an integral component of the suspension unit, i.e., a single reservoir could be common or supply all of the suspension unit of a vehicle, for example.

Briefly, in review, considering FIGURE 3, for example, during initial loading the diaphragm 58 would be flexed toward the condition shown therein. An extreme sudden load might cause an excessive pressure build up which would be partially dampened by apertures and relieved by valve element 162 bypassing fluid back to reservoir 38.

Movement of the vehicle and normal reciprocation of the chassis of the vehicle causes fluid to be "pumped" or drawn into the shock absorbing chamber 72 to cause the chamber to fill up again or be maintained at a predetermined level. It will be kept in mind that the position of FIGURE 3 is an extreme one.

After the shock absorbing chamber 72 reaches the predetermined level and plate 116 engages head 120 and unseats seal 140; note FIGURE 4 (also an extreme position), fluid is recirculated back to reservoir 38.

The chamber 52 will counteract changing pressures within the chamber 64 since the fluid in the shock absorbing chamber 72 reacts on the fluid in chamber 64.

The suspension unit thus functions as a shock absorber as well as maintaining a constant attitude or level for the vehicle chassis with respect to the running gear.

It will be obvious to those skilled in the art that various changes may be made without departing from the spirit of the invention and therefore, the invention is not limited to what is shown in the drawings and described in the specification, but only as set forth in the appended claims.

What is claimed is:

1. A leveling and suspension device for use between a vehicle chassis and a vertically oscillatable wheel support, comprising a cylinder communicating with a hollow head, said head including a flexible, impervious diaphragm defining opposed, variable-volume chambers, one of said chambers being compressible and said other chamber comprising liquid-containing chamber; a piston supported for axial movement in said cylinder and defining thereabove a variable-volume, shock-absorbing chamber communicating with said liquid-containing chamber and a lower pump chamber; and pump means in said cylinder connected to fluid reservoir means for pumping fluid into said shock-absorbing chamber and connected to and operated by relative movement of said piston with respect to said cylinder, said pump means comprising one-way valve means causing fluid to normally be directed only from said pump chamber toward said shock absorbing chamber due to said relative movement between said piston and cylinder, said pump means comprising an elongated tubular plunger including axially-separable inlet portions above said piston and normally closed during relative movement between said piston and cylinder, said axially-separable inlet portions separating to directly connect said shock absorbing chamber to said reservoir after a predetermined amount of relative axial separation between said piston and cylinder.

2. The structure as claimed in claim 1 in which said pump means includes a spring engaged between said axially-separable inlet portions for normally urging the same together.

3. The structure as claimed in claim 1 including anti-surge baffle means disposed in said cylinder between said shock-absorbing and liquid-containing chambers.

4. The structure as claimed in claim 1 in which said piston comprises an axial bore reciprocably receiving said tubular plunger, said axially-separable inlet portions comprising a terminal valve head and seal, and an internal one-way valve in said tubular plunger valve head.

5. The structure as claimed in claim 1 in which said axially-separable inlet portions comprise a tubular axial extension integral with said cylinder head, said axial extension and tubular plunger respectively include mated sealing surface portions normally sealingly engaged.

6. The structure as claimed in claim 1 in which said plunger includes an upper valve head having a seal element secured at the upper end thereof.

7. The structure as claimed in claim 6 in which said valve head includes an axially extending tubular extension upon which said seal element is secured.

8. The structure as claimed in claim 1 in which said cylinder head includes pressure relief valve means interposed between said shock-absorbing chamber and said reservoir for relieving excessive build up of internal pressure in said shock-absorbing chamber.

9. The structure as claimed in claim 1 including a pair of mutually reversed one-way valves operatively connected between said fluid reservoir and said inlet portions for maintaining the fluid level in said liquid-containing chamber and said shock-absorbing chamber.

References Cited in the file of this patent
UNITED STATES PATENTS

| | | |
|---|---|---|
| 2,942,873 | Wordsworth | June 28, 1960 |
| 2,985,444 | Cadiou | May 23, 1961 |
| 3,033,556 | Wossner | May 8, 1962 |
| 3,036,844 | Vogel | May 29, 1962 |